United States Patent [19]

Ems

[11] Patent Number: 5,205,482
[45] Date of Patent: Apr. 27, 1993

[54] SANITARY MIXING UNIT

[75] Inventor: Josef Ems, Wittlich, Fed. Rep. of Germany

[73] Assignee: Ideal-Standard GmbH, Bonn, Fed. Rep. of Germany

[21] Appl. No.: 859,442

[22] PCT Filed: Jan. 31, 1990

[86] PCT No.: PCT/DE90/00059

§ 371 Date: Jul. 21, 1992

§ 102(e) Date: Jul. 21, 1992

[87] PCT Pub. No.: WO91/08532

PCT Pub. Date: Jun. 13, 1991

[30] Foreign Application Priority Data

Nov. 25, 1989 [DE] Fed. Rep. of Germany ....... 3939077

[51] Int. Cl.[5] ............................................. G05D 23/13
[52] U.S. Cl. .................................... 236/12.1; 74/411; 137/606; 251/81
[58] Field of Search ....................... 236/12.1; 137/606; 251/81; 74/411; 464/45, 46

[56] References Cited

U.S. PATENT DOCUMENTS

| 622,912 | 4/1899 | Corey, Jr. | 251/81 |
| 1,641,560 | 9/1927 | Whidden | 137/607 X |
| 1,990,090 | 2/1935 | Packard | 251/81 |
| 2,171,992 | 9/1939 | Rantine | 236/12.1 X |
| 2,332,995 | 10/1943 | Eaton | 236/12 |
| 2,575,305 | 11/1951 | Stryzakowski et al. | 137/607 X |
| 3,002,531 | 10/1961 | Katra | 137/607 X |
| 3,011,721 | 12/1961 | Wiltz | 251/81 X |
| 3,105,371 | 10/1963 | Forrest | 74/41 X |

FOREIGN PATENT DOCUMENTS

| 0307738 | 9/1988 | European Pat. Off. |
| 2355101 | 11/1973 | Fed. Rep. of Germany |
| 492052 | 9/1938 | United Kingdom |

Primary Examiner—William E. Tapolcai
Attorney, Agent, or Firm—Robert W. Becker & Associates

[57] ABSTRACT

A sanitary mixing unit, especially in the form of a single thermostat, has a cold and hot water inlet and a mixed water outlet. Valves for shutting off and controlling the water flow are arranged before the thermostat control and thus before the mixing chamber in the direction of flow. The valves are simultaneously activatable by a spindle. The movable valve closing members are fine adjustable independent from one another relative to the respective valve seats for a secure shut-off. An automatic fine adjustment of the movable valve closing members during shut-off of the mixing unit is provided by employing a central spindle with a fixedly arranged toothed wheel at its end section facing the valves. The toothed wheel engages two spur gears which are cooperating via a slip coupling with two single spindles of the valves.

3 Claims, 2 Drawing Sheets

SANITARY MIXING UNIT

BACKGROUND OF THE INVENTION

The invention relates to a sanitary mixing unit in the form of a single thermostat with a cold water and a hot water inlet and a mixed water outlet and with valves for shut-off and flow control arranged in the direction of flow before the thermostat control and thus before the mixing chamber, the valves being actuatable simultaneously via a spindle, whereby the movable valve closing members are fine adjustable independent from one another relative to the corresponding valve seats for a secure shut-off.

Mixing units of the aforementioned kind are known from German Patent 23 55 101. A so called control axle in the form of a spindle is provided on which two valve cones functioning as valve closing members for the shut-off and flow control of the cold and the hot water are arranged whereby one of the valve cones is adjustable relative to the control axle. Due to such an arrangement, a fine adjustment of the valve cones relative to the corresponding valve seats may be performed independent from one another at any time if a secure shut-off is not or no longer possible; however, for such a fine adjustment a demounting of the shut-off and flow regulating handle as well as the use of tools is necessary.

It is therefore an object of the invention to eliminate this disadvantage and to provide a sanitary mixing unit of the aforementioned kind in which a possible fine adjustment of the movable valve closing members occurs automatically during shut-off of the mixing unit.

SUMMARY OF THE INVENTION

This object is inventively solved essentially by providing the spindle as a central spindle and by providing a toothed wheel at its end section facing the valves which is engaged by two spur gears which are cooperating via a slide coupling with two individual spindles for the valves.

The thermostat-controlled sanitary mixing unit according to the present invention comprises essentially a thermostat control; a flow control comprised of a central spindle and a cold water inlet and a hot water inlet, and further comprising a first valve connected to the cold water inlet and a second valve connected to the hot water inlet, the first and the second valves serving to shut off and control water flow, the spindle simultaneously activating the first and second valves; the first and the second valves each comprising a movable valve closing member and a valve seat, the valve closing members being fine adjustable relative to the corresponding valve seat independent of one another for a secure shut-off; the central spindle comprising a toothed wheel that is fixedly attached to one end of the central spindle facing the valves; and each valve comprising a single spindle connected with one end to the valve for activating the valve, the single spindle comprising a bearing ring fixedly connected to a free end of the spindle and a spur gear connected to the bearing ring so as to be movable relative to the bearing ring, the spur gear engaging the toothed wheel, with the bearing ring and the spur gear forming a slip coupling.

It is expedient that the bearing ring has an outer collar and the spur gear has an inner collar, the inner collar of the spur gear resting on said outer collar of the bearing ring. The mixing unit further comprises a spring ring cooperating with the inner collar, and the bearing ring further comprises a peg for supporting the spring ring and for pressing with that spring ring the inner collar against the outer collar for effecting the slip coupling.

Preferably, the peg has an outer beaded edge for holding and supporting the spring ring.

From U.S. Pat. No. 2,332,995 as well as from British patent GB-A-492 052 sanitary mixing units are already known which have valves within the cold and hot water inlets equipped with spur gears cooperating with a toothed wheel of a central spindle for controlling water flow. The U.S. patent also shows a thermostat-controlled mixing unit. However, the connection for achieving this cooperation is permanent such that in any operational condition a form-locking connection is effective. An adjustment especially of only one of the valves is thus impossible during shut-off.

Inventively, the slide coupling is automatically effective in cases when during the shut-off of the mixing unit one of the valve closing members does not completely close the corresponding water opening simultaneously with the other valve closing member. In such a case a relative movement between the spur gear and the bearing ring of the already closed valve occurs due to a slight further movement of the central spindle since its end abutment has already been reached and, on the other hand, via the central spindle the single spindle of the other valve is simultaneously activated until a complete shut-off has been achieved which automatically results in a fine adjustment of the corresponding valve closing members relative to the respective valve seat.

BRIEF DESCRIPTION OF THE DRAWINGS

In the drawing the object of the invention is represented in one embodiment, and it is shown in.

Figure 1:
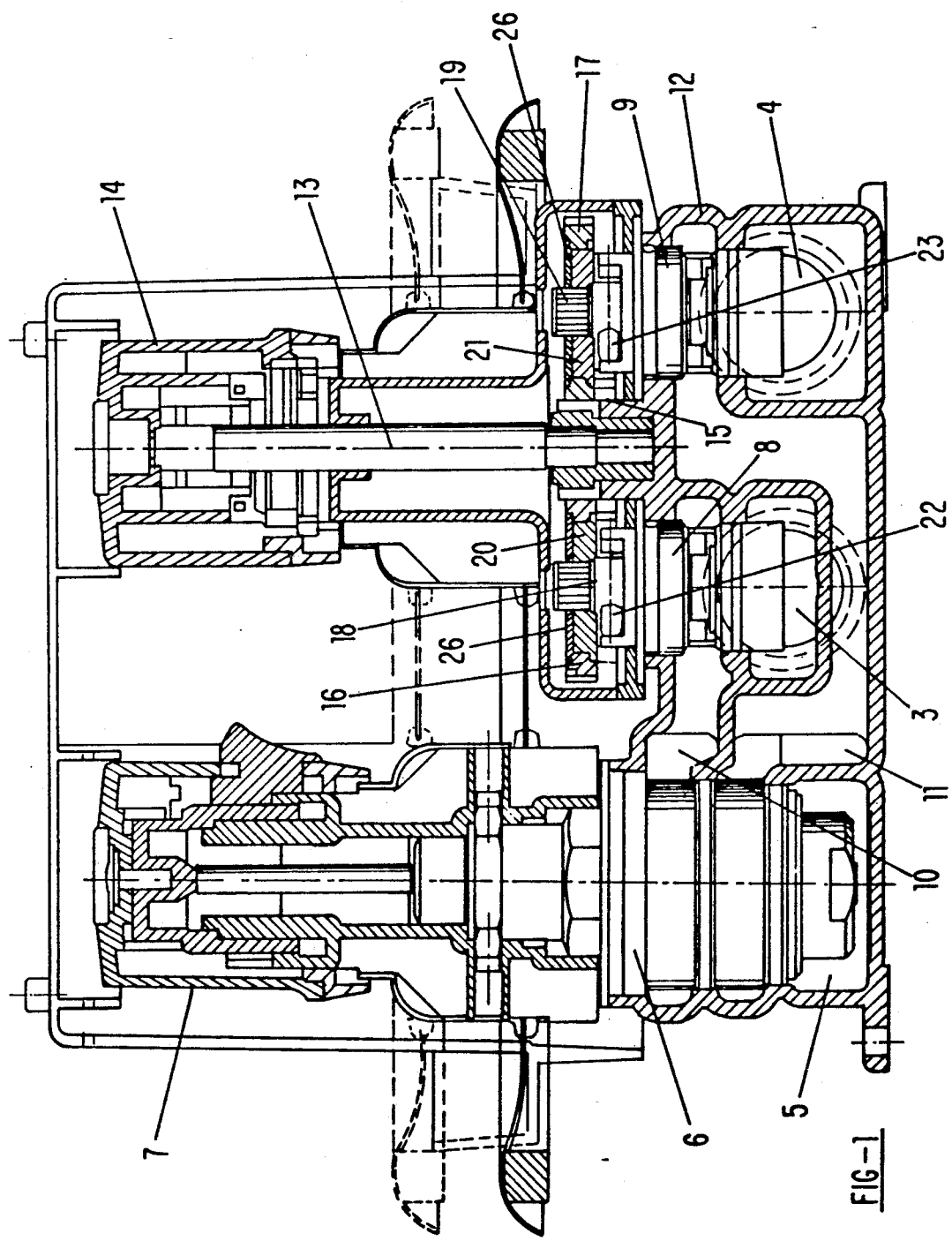
FIG. 1 a longitudinal cross-sectional view of an inventive mixing unit for a concealed mounting, and FIG. 2 an inventive slip coupling in an enlarged representation.

A cold water inlet is indicated at 3, a hot water inlet at 4 and a mixing chamber, respectively, a mixed water outlet is indicated at 5. In the flow direction, before a conventional and thus not further explained thermostat control 6 with an actuating handle 7 for the temperature preadjustment and thus before the mixing chamber 5, a cold water valve 8 and a hot water valve 9 5, a cold water valve 8 and a hot water valve 9 are provided from which the water via openings 10 and 11 flows into the thermostat control 6. The valves 8 and 9 serve as shut-off and flow control means and are comprised of a cartridge-like component which is screwed into the mixing unit housing 12. The control elements, not shown in the drawings, are disks made of aluminum oxide whereby one of them functions in a conventional manner as a stationary valve seat and the other as a movable valve closing member.

The valves 8 and 9 are simultaneously driven via a central spindle 13 and an actuating handle 14. For this purpose, the central spindle 13 at its end section facing the valves 8 and 9 is provided with a fixedly arranged toothed wheel 15 which is engaged by two spur gears 16 and 17 which, in turn cooperate with two single spindles 18 and 19 for the valves 8 and 9.

Figure 2:
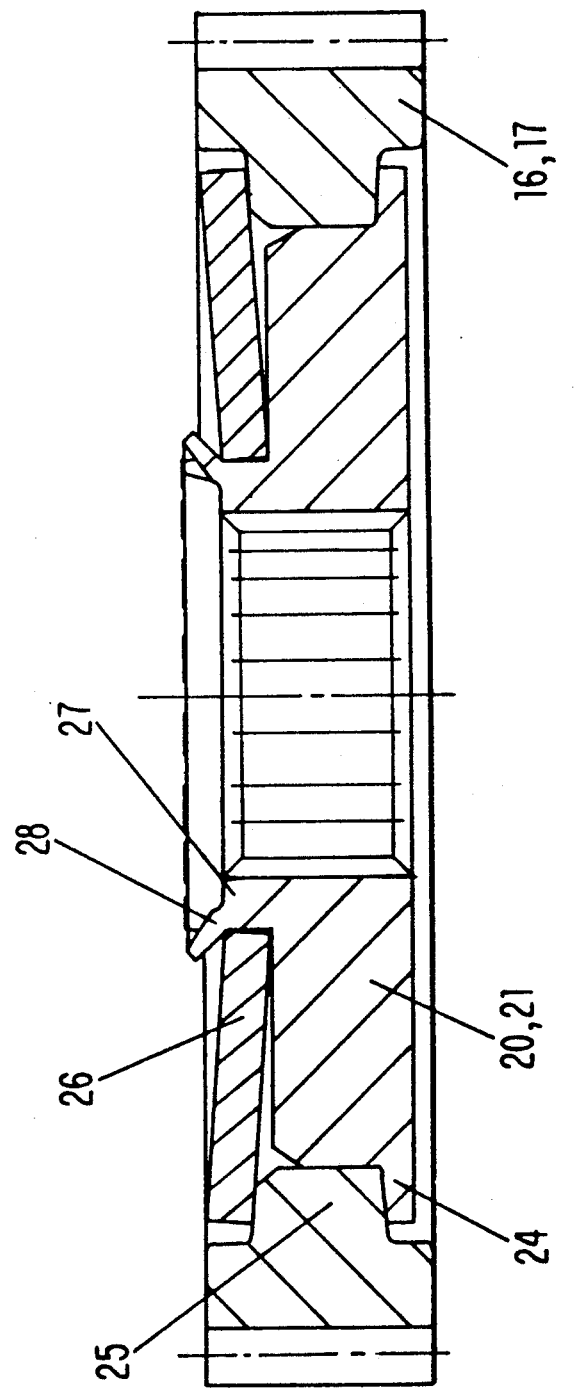

From FIG. 2 it may be taken in particular that the spur gears 16 and 17, for the formation of a slip coupling, are mounted on two bearing rings 20 and 21. The bearing rings 20 and 21 are fixedly arranged on free knurled ends of the single spindles 18 and 19 the rotational movement of which is limited by abutments 22 and 23.

The bearing rings 20 and 21 are provided with an outer collar 24. The spur gears 16 and 17 are supported with one side of an inner collar 25 at the outer collar 24. The other side of the inner collar 25 cooperates with a spring ring 26 which is held on a peg 27 of the bearing rings. This spring ring 26 presses, for the formation of the slide coupling, the inner collar 25 of the spur gears 16 and 17 against the outer collar 24 of the bearing rings 20 and 21. The peg 27 is provided with a beaded edge 28 for axially holding and supporting the spring ring 26.

Should during the shut-off of the mixing unit one of the movable valve closing members not close the respective water opening completely, for example, the water opening of the cold water valve 8, simultaneously with the other valve closing member, the slide coupling on the side of the already closed hot water valve 9 is activated since its abutment 23 prevents a further rotation of the single spindle 19. Via the central spindle 13 the single spindle 18 of the cold water valve 8 is further activated until the shut-off is complete and thus until the second abutment 22 is effective. In the direction of closing only the spur gears 16 and 17 of the single spindles 18 and 19 may now be turned.

According to the invention, during the shut-off process a possibly required fine adjustment of the movable valve closing members relative to the corresponding valve seat will be automatically performed so that always a secure shut-off is ensured and mounting as well as service tasks are facilitated.

Furthermore, cross-flow risks are also prevented due to the shut-off taking place in the direction of flow before the mixing chamber 5, i.e., the introduction of hot water into the cold water inlet or vice versa is prevented. For a shut off that is located behind the mixing chamber in the direction of flow, additional check valves are required which, however, cannot guarantee a secure functioning especially at low pressures, which has been proven in practice.

The represented and described embodiment is only one example for realizing the invention, and the invention is not limited to this embodiment; thus, within the scope of the inventive idea other embodiments and applications are possible. For example, the valves 8 and 9 could be provided with axially movable valve closing members, such as so-called valve cones, and furthermore, the application of the inventive slide coupling is also suggested for other valve constructions.

The present invention is, of course, in no way restricted tot he specific disclosure of the specification and drawings, but also encompasses any modifications within the scope of the appended claims.

What I claim is:

1. A thermostat-controlled sanitary mixing unit, comprising:
   a thermostat control;
   a flow control comprised of a central spindle and a cold water inlet and a hot water inlet, further comprising a first valve connected to said cold water inlet and a second valve connected to said hot water inlet, said first and said second valves serving to shut off and control water flow, said spindle simultaneously activating said first and said second valves;
   said first and said second valves each comprising a movable valve closing member and a valve seat, said valve closing members being fine adjustable relative to said corresponding valve seat independent of one another for a secure shut-off;
   said central spindle comprising a toothed wheel that is fixedly attached to one end of said central spindle facing said valves; and
   each said valve comprising a single spindle connected with one end to said valve for activating said valve, said single spindle comprising a bearing ring fixedly connected to a free end of said spindle and a spur gear connected to said bearing ring so as to be movable relative to said bearing ring, said spur gear engaging said toothed wheel, with said bearing ring and said spur gear forming a slip coupling.

2. A sanitary mixing unit according to claim 1, wherein said bearing ring has an outer collar and wherein said spur gear has an inner collar, said inner collar of said spur gear resting on said outer collar of said bearing ring, and further comprising a spring ring cooperating with said inner collar, and said bearing ring further comprising a peg for supporting said spring ring and for pressing with said spring ring said inner collar against said outer collar for effecting said slip coupling.

3. A sanitary mixing unit according to claim 2, wherein said peg has an outer beaded edge for holding and supporting said spring ring.

* * * * *